(12) United States Patent
Ackerman et al.

(10) Patent No.: US 12,670,440 B2
(45) Date of Patent: Jun. 30, 2026

(54) GENERATING AN ERROR POLICY FOR A MACHINE LEARNING ENGINE

(71) Applicant: INTERNATIONAL BUSINESS MACHINES CORPORATION, Armonk, NY (US)

(72) Inventors: Samuel Solomon Ackerman, Haifa (IL); Orna Raz, Haifa (IL); Eitan Daniel Farchi, Pardes Hana-Karku (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 18/069,150

(22) Filed: Dec. 20, 2022

(65) Prior Publication Data

US 2024/0202575 A1      Jun. 20, 2024

(51) Int. Cl.
*G06F 18/211* (2023.01)
*G06F 18/21* (2023.01)
*G06N 20/00* (2019.01)

(52) U.S. Cl.
CPC ........... *G06N 20/00* (2019.01); *G06F 18/211* (2023.01); *G06F 18/217* (2023.01)

(58) Field of Classification Search
CPC ...... G06F 18/211; G06F 18/217; G06N 20/00
See application file for complete search history.

(56) References Cited

U.S. PATENT DOCUMENTS

| | | | |
|---|---|---|---|
| 11,288,115 B1 | 3/2022 | Katsis et al. | |
| 11,315,043 B1* | 4/2022 | Lopatecki | ........... G06F 18/2113 |
| 11,514,311 B2* | 11/2022 | Brill | ...................... G06F 18/217 |
| 2020/0334492 A1 | 10/2020 | Yuan et al. | |
| 2020/0410116 A1* | 12/2020 | Williamson | ........... G06N 20/00 |
| 2021/0103876 A1 | 4/2021 | Petrosso et al. | |
| 2022/0253647 A1* | 8/2022 | Perkins | .............. G06F 11/3086 |
| 2023/0061914 A1* | 3/2023 | Funk | .................. G06Q 20/4016 |
| 2024/0028945 A1* | 1/2024 | Yadgaran | ............... G06N 20/20 |

OTHER PUBLICATIONS

Das, S. et al., "CACTUS: Detecting and Resolving Conflicts in Objective Functions," arXiv preprint, arXiv:2103.07805, Mar. 13, 2021, 13 pg.

(Continued)

*Primary Examiner* — Beau D Spratt
(74) *Attorney, Agent, or Firm* — Harrity & Harrity, LLP

(57) ABSTRACT
A computer hardware system includes a slice generator and a policy generator and performs the following. The slice generator slices a first dataset including true values and predicted values of a class variable into a plurality of slices each defining a plurality of observations within the first dataset. A first one and another one of the plurality of slices are selected, and a union of observations is generated by adding observations within the selected another one to observations within the selected first one of the plurality of slices. The selecting another one of the plurality of slices and the generating the union is repeated until a number of observations within the union reaches a predetermined value. Using the policy generator and after the number of observations within the union reaches the predetermined value, an error policy is generated. The predicted values were generated by a machine learning engine.

20 Claims, 4 Drawing Sheets

(56) References Cited

OTHER PUBLICATIONS

Ackerman, S. et al., "Density-based interpretable hypercube region partitioning for mixed numeric and categorical data," arXiv preprint, arXiv:2110.05430, Oct. 11, 2021.

Ackerman, S. et al., "FreaAI: Automated extraction of data slices to test machine learning models," InInternational Workshop on Engineering Dependable and Secure Machine Learning Systems, Feb. 7, 2020, pp. 67-83, Springer, Cham.

Mell, P. et al., The NIST Definition of Cloud Computing, National Institute of Standards and Technology, U.S. Dept. of Commerce, Special Publication 800-145, Sep. 2011, 7 pg.

Sivasubramanian, D. et al., "Training Data Subset Selection for Regression with Controlled Generalization Error," arXiv preprint, arXiv:2106.12491. Jun. 23, 2021, 27 pg.

Zhu, G. "A new view of classification in astronomy with the archetype technique: An astronomical case of the np-complete set cover problem," arXiv preprint, arXiv:1606.07156. Jun. 23, 2016, 17 pg.

Fischetti, M. et al., "Cutting plane versus compact formulations for uncertain (integer) linear programs," Mathematical Programming Computation, Sep. 2012, vol. 4, No. 3, pp. 239-273.

\* cited by examiner

GENERATING AN ERROR POLICY FOR A MACHINE LEARNING ENGINE

BACKGROUND

The present invention relates to machine learning, and more specifically, to generating an error policy for a machine learning engine.

Machine learning is an important component of the growing field of data science. Through the use of statistical methods, algorithms are trained to make classifications or predictions, and to uncover key insights in data mining projects. An example of a machine learning engine (also referred to herein as a classifier or predictor) may take an email as an input and using the data associated with the email (e.g., the header, the body of the email, the sender) to classify the email as "spam" or "not spam." As another example, a structured dataset consisting of observations (rows, e.g., individuals) and features recorded for each observation (e.g., age, income, occupation, state of residence) can be used to predict (e.g., using a predictor/machine learning engine) a particular target class feature (e.g., whether or not a loan is approved). The machine learning engine is correct for a particular observation if the predicted value (e.g., whether the loan ins approved or not) for the target class feature equals the true value of the target class feature. Otherwise, the machine learning engine has erred.

One way to improve the performance of the machine learning engine is to perform fault localization on the input dataset. In particular, it is desirable to identify those observations in which the predicted value of the target class feature does not equal the true value of the target class feature. This information can be used to diagnose the predictor's performance. This information can also be used to fix the input dataset in some way (e.g., to manually label/inspect some subset of the observations rather than rely on the predictor). In this manner, the predictor can have a higher accuracy in predicting the value of the target class feature.

Existing methods for fault localization typically involve using metrics on individual observations. For example, the machine learning model confidence (higher is better) or the uncertainty of its predictive distribution (higher is worse) on each observation can be measured individually. By way of example, for a given budget of 10% of the observations, an error policy could consist of the 10% of the observations having the lowest confidence (or highest uncertainty), and these observations could be omitted from the dataset or subject to additional human verification. However, such a method can lack qualities such as human-interpretability, compactness, and robustness. For example, selecting 10% of the observations with the lowest confidence levels does not necessarily provide interpretable data that allows a user to understand why those observations were selected. Also, it is not necessarily the situation in which these observations were selected for underlying reasons that are similar to each other, which would help diagnose the machine learning engine.

SUMMARY

A computer-implemented method within a computer hardware system that includes a slice generator and a policy generator includes the following. The slice generator slices a first dataset including true values and predicted values of a class variable into a plurality of slices each defining a plurality of observations within the first dataset. The predicted values were generated by a machine learning engine. A first one and another one of the plurality of slices are selected, and a union of observations is generated by adding observations within the selected another one to observations within the selected first one of the plurality of slices. The selecting another one of the plurality of slices and the generating the union is repeated until a number of observations within the union reaches a predetermined value. Using the policy generator and after the number of observations within the union reaches the predetermined value, an error policy is generated.

In other aspects of the method, the error policy includes all feature value conditions used to generate each of the selected slices, and the machine learning engine can be modified based upon the error policy. The selected slices can be selected based upon a ratio of observations having predicted values not equaling true values for each of the selected slices. The predetermined value is one of an absolute number of observations in the union of observations or as a percentage of observations in the first dataset. Also, the policy can be applied to a second dataset different than the first dataset to generate a second union of observations for the second dataset.

A computer hardware system includes a slice generator and a policy generator and performs the following. The slice generator slices a first dataset including true values and predicted values of a class variable into a plurality of slices each defining a plurality of observations within the first dataset. A first one and another one of the plurality of slices are selected, and a union of observations is generated by adding observations within the selected another one to observations within the selected first one of the plurality of slices. The selecting another one of the plurality of slices and the generating the union is repeated until a number of observations within the union reaches a predetermined value. Using the policy generator and after the number of observations within the union reaches the predetermined value, an error policy is generated. The predicted values were generated by a machine learning engine.

In other aspects of the hardware system, the error policy includes all feature value conditions used to generate each of the selected slices, and the machine learning engine can be modified based upon the error policy. The selected slices can be selected based upon a ratio of observations having predicted values not equaling true values for each of the selected slices. The predetermined value is one of an absolute number of observations in the union of observations or as a percentage of observations in the first dataset. Also, the policy can be applied to a second dataset different than the first dataset to generate a second union of observations for the second dataset.

A computer program product includes a computer readable storage medium having stored therein program code. The program code, which when executed by a computer hardware system including a slice generator and a policy generator, causes the computer hardware system to perform the following. The slice generator slices a first dataset including true values and predicted values of a class variable into a plurality of slices each defining a plurality of observations within the first dataset. A first one and another one of the plurality of slices are selected, and a union of observations is generated by adding observations within the selected another one to observations within the selected first one of the plurality of slices. The selecting another one of the plurality of slices and the generating the union is repeated until a number of observations within the union reaches a predetermined value. Using the policy generator and after the number of observations within the union reaches the predetermined value, an error policy is generated. The predicted values were generated by a machine learning engine.

In other aspects of the computer program product, the error policy includes all feature value conditions used to generate each of the selected slices, and the machine learning engine can be modified based upon the error policy. The selected slices can be selected based upon a ratio of observations having predicted values not equaling true values for each of the selected slices. The predetermined value is one of an absolute number of observations in the union of observations or as a percentage of observations in the first dataset. Also, the policy can be applied to a second dataset different than the first dataset to generate a second union of observations for the second dataset.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
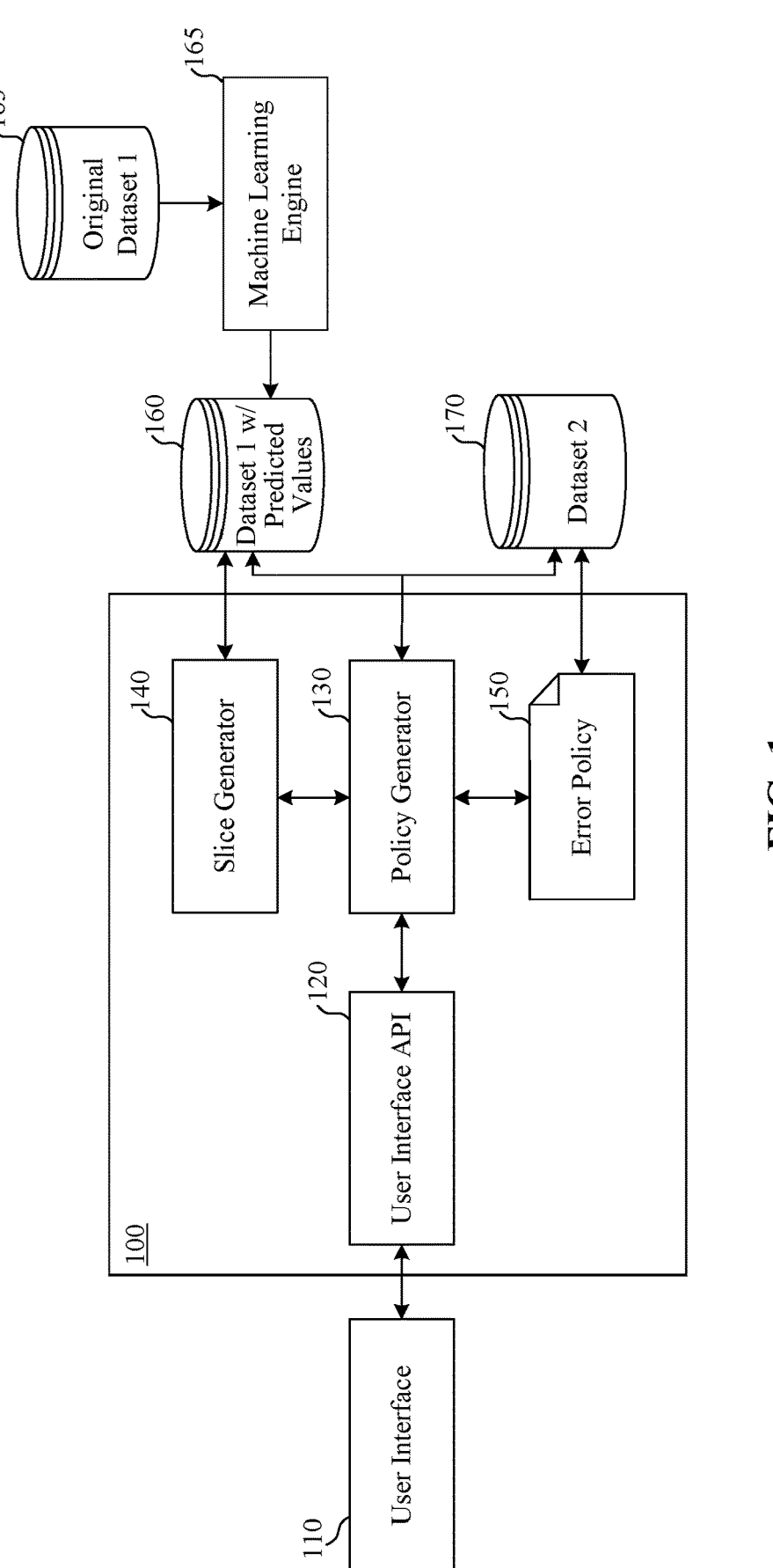
FIG. 1 is a block diagram illustrating an architecture of an example policy generation system according to at least one embodiment of the present invention.
Figure 2:
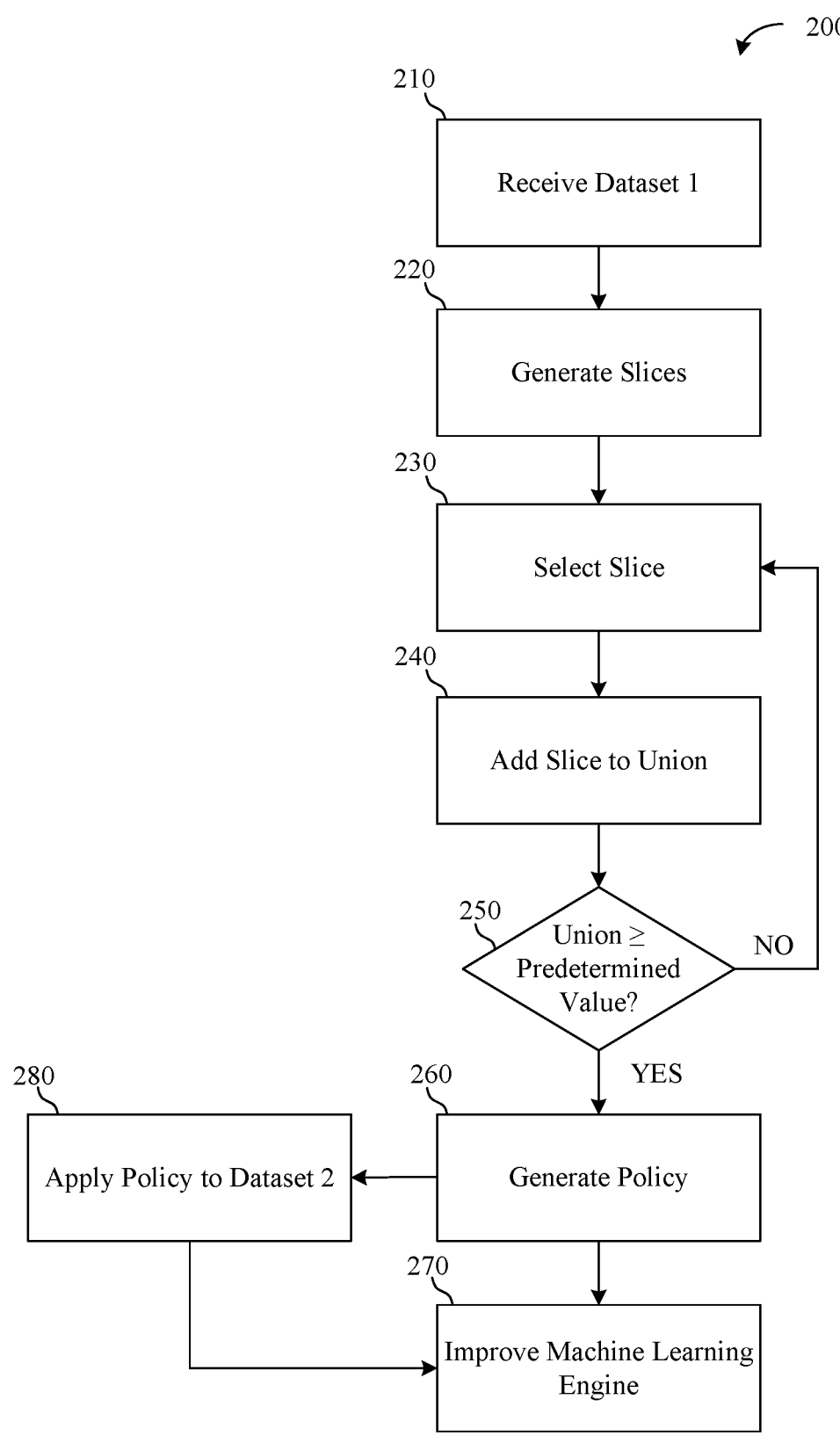
FIG. 2 illustrates an example method using the architecture of FIG. 1 according to at least one embodiment of the present invention.

Reference is made to FIG. 1 and FIG. 2, which respectively illustrate a policy generation system 100 and methodology 200 for generating an error policy for a machine learning engine 165. Although illustrated as being within a single system 100, the individual components 120, 130, 140, 150 of the policy generation system 100 can be distributed over a plurality of computer devices. These individual components can include, for example, a user interface API 120 that interfaces with a user interface 110, a policy generator 120, a slice generator 140, and an error policy 150. Also, while illustrated as being stored separately from the policy generation system 100, one or more of the datasets 160, 170 could be stored within the policy generation system 100. Additionally, the machine learning engine 165 could be within a standalone computer system (not shown) or located in a cloud computing system such as described in FIG. 4.

Although not limited in this manner, the policy generation system 100 includes a slice generator 140 and a policy generator 130. The slice generator 130 can be configured to slice a first dataset 160 including true values and predicted values of a class variable into a plurality of slices that each define a plurality of observations within the first dataset 160. The predicted values are generated by a machine learning engine 165. After a first slice and another one of the plurality of slices are selected, a union of observations can be generated by adding observations within the first slice to the observations within the selected another one of the slices.

The selecting of another one of the slices and adding observations in that selected another one of the slices can be repeated until a number of observations within the union reaches a predetermined value. Using the policy generator 130 and after the number of observations within the union reaches the predetermined value, an error policy 150 is generated. The error policy 150 includes all feature value conditions used to generate each of the selected slices, and the machine learning engine 165 can be modified based upon the error policy 150. More details of the policy generation system 100 and methodology 200 are discussed below.

Although not limited in this manner, one goal of the policy generation system 100 is to generate an error policy 150 that is human-interpretable, compact, and robust. Human-interpretability in machine learning is a known concept, and in the context of the present policy generation system 100 refers to the error policy 150 capable of being explained to a human/user in a way that will help the user understand the shortcomings of the machine learning engine 165. For example, an error policy 150 containing all observations with confidence below a certain threshold does not help the user understand what these observations have in common (other than the fact they all have low confidence) which could be used to help diagnose any deficiencies of the machine learning engine 165.

Compactness means the error policy 150 should be specified in a compact way (e.g., 'containing all observations with confidence below threshold x'). An example of a non-compact policy would be simply a list of the indices of the observations.

Robustness refers to the ability of the error policy 150 to generalize from one dataset 160 to another dataset 170 and to do so with similar performance. In other words, use of the error policy 160 between one dataset 160 to another dataset 170 should result in a similar error proportion for both datasets 160, 170. Robustness is a common problem in general when using insights learned from one dataset on another.

By way of example, the policy generation system 100 attempts to perform fault localization by constructing a subset of observations (referred to herein as a union of observations) that contain a high concentration of the classification errors (i.e., instances in which the value of a class variable predicted by the machine learning engine 165 does not correspond to the true value of the class variable) while also being as small as possible (e.g., below some "budget," such as a proportion of the observations in the dataset or absolute value of the number of observations). For example, if the dataset 160 had 1000 observations of which 50 (i.e., 5%) are errors, a budget for the error policy 150 could be at most 5%, which would identify at most 5% of the total observations (i.e., 50 observations) that represent a high concentration of errors. However, the budget is not limited as to the number of errors. In certain aspects, the budget represents a practical limitation on the ability to review the union of observations. This information could then be used to diagnose/improve the machine learning engine 165.

One scenario would involving identifying the 50 errors by themselves, which would cover 100% of the errors while having 100% internal error rate since all observations in the identified subset are errors. However, this identification is very likely not human-interpretable as the errors themselves are unlike to provide the user with an understanding of the cause of the errors (i.e., which feature-value combinations cause errors). According to the present disclosure, an error policy 150 is generated that provides a list of slices (each of which is preferably human-interpretable, and thus a union/combination of these observations may also be human-interpretable).

For example, an error policy 150 can include 8 slices, and contains 45 observations (below a hypothetical budget of 50), of which 30 are errors. In this instance, the error policy 150 covers 60% ($^{30}/_{50}$) of the errors, while containing an internal error rate of 66% ($^{30}/_{45}$), which is higher than the 5% of the dataset 160 as a whole. The generation of such an error policy 150 represents an improvement since the error policy 150 is human-interpretable, compact, and should be robust because the slices are determined based on the features.

The error policy 150 can then be used to translate a similar dataset 170 to generate a subset of observations in the second dataset 170 that correspond to condition/feature combinations that define the error policy 150. This subset of observations in the second dataset 170 can then be presumed to also have a higher error concentration. In other words, the error policy 150 generated from a first dataset 160 can be used to predict a subset of observations from a second dataset 160 that are likely to have a high concentration of errors.

The term "error policy," as used herein, refers to a compact localization of machine learning predictions errors. Each of the plurality of slices of the dataset 160 define a smaller subset of the dataset 160 based upon condition/feature combinations respectively associated with each slice, and the error policy 150 is formed by combining these multiple, smaller observation subsets (i.e., slices). The error policy 150 can be used to translate the dataset 160 into a subset of observations which corresponds to a union of observations from the plurality slices of the dataset 160. In certain aspects of the policy generation system 100, each of the condition/feature combinations (typically defined using a compound expression) are human-interpretable.

As an example, observations associated with a slice can be defined using a compound expression such as: "observations where (10<=AGE<=40) AND (OCUPATION=doctor) AND (STATE in {CA, NY, TX})". In this instance, a feature would be "AGE" and the condition would be "10<=AGE<=40" which identifies values associated with the feature. In this instance, since the logical operators are "AND." any observation that satisfies all of the condition/feature combinations within the compound expression would be selected for the slice. This compound expression is interpretable as a user can understand how observations associated with the slice are generated. As discussed in more detail below, the slices (and their respective compound expressions) are selected so as to identify a subset of observations (defined by the compound expression) having a higher ratio of observations having predicted values not equaling true values for each of the selected slices than the observations within the dataset 160 as a whole. Although the compound expression referred to herein generally applies to multiple condition/feature combinations, in certain instances a slice can be defined by a single condition/feature combination. In general, however, the compound expression will typically include 3 or 4 condition/feature combinations.

With reference to FIG. 2, a generic process 200 for generating and using an error policy 150 is disclosed. In 210, a first dataset 160 that includes true values and predicted values of a class variable is received. The predicted values of the class variable (e.g., "Loan Approved?" or "Is e-mail spam?") in the first dataset 160 are generated by applying a predictor (e.g., machine learning engine 165) to an original first dataset 163.

In 220, the policy generator 130 in conjunction with the slice generator 140 divides the first dataset 160 into a plurality of slices. As discussed above, a slice can be defined using a compound expression such as: "observations where {STATE in {NY, NJ}} & {10<=EXPERIENCE<=13}." In many instances, these slices are human-interpretable. For example, the slice above could be interpreted as "mid-level employees living in New York or New Jersey." In certain aspects, the slice generator 140 is configured to generate slices of the dataset 160 that are human-interpretable, compact, and/or robust. Different methodologies for generating slices of a dataset 160 are known, and the slice generator 140 is not limited as to a particular methodology. However, in certain aspects of the policy generation system 100, the slice generator 140 uses FreaAI, which is a technique described in the article entitled "FreaAI: Automated extraction of data slices to test machine learning models," by Ackerman et al., which is incorporated herein by reference in its entirety.

In 230, after a plurality of slices of the dataset 160 have been generated, a first one of the plurality of slices is selected. In certain aspects, the policy generator 130 selects, as the first slice, a slice that contains a highest percentage of errors (i.e., the predicted value of the class variable of interest not equaling the true value of the class variable of interest). In 240, the observations corresponding to the selected slice are used to form a union of observations.

In 250, the union of observations are evaluated to determine if the number of observations reaches some predetermined value. Although not limited in this manner, the number of observations can be limited to an absolute number (e.g., 100) or as a percentage of the total observations in the dataset 160. In certain aspects, the predetermined value is selected so as to be human-interpretable (e.g., capable of being feasibly analyzed by a human). If the predetermined value is not reached, operations 230 and 240 are repeated until the predetermined value is reached. For example, after the union of observations are evaluated after the first slice is selected, the process 200 proceeds to select a second slice in 230 whose observations are added to the union of observations in 240. The modified union of observations is then evaluated again in 250. Once the predetermined value has been reached, the process 200 proceeds to 260. The observations within a slice are unique to the slice. However, in certain aspects, there will be instances in which the selected slices will have overlapping observations. In this instance, each observation will only appear a single time in the union of observations.

In 260, the error policy 150 is generated by the policy generator 150. As discussed above, the error policy 150 includes the all of the compound expressions from all of the selected slices used to populate the union of observations. Once, the error policy 150 has been generated, there are different possible uses for the error policy 150.

For example, in 270, the error policy 150 can be used to diagnose and/or improve the machine learning engine 165. The process 200 is not limited as to how the machine learning engine 165 is diagnosed and/or improved. For example, if many of the observations fall into a slice such as AGE>=70, a determination can be made that the population of people aged >=70 in the training set differ in other characteristics from the same population in the test dataset. Alternatively, it may be recognized that the training dataset do not include people in this slice at all. As another example, if many slices in the error policy 150 included the same feature, then a determination can be made that this feature, in general, is problematic and further investigation is needed.

Alternatively, in 280, the error policy 150 can be applied to a second dataset 170 that is similar to the first dataset 160. If the application of the error policy 150 to the second dataset 170 results in the error policy 150 identifying a high percentage of errors in the second dataset 170, then a determination can be made that the error policy 150 is robust (i.e., the error policy 150 can generalize from one dataset 160 to another dataset 170 and to do so with similar performance). With a determination that the error policy 150 is robust, the process can also proceed to 170 in which the error policy can be used to diagnose and/or improve the machine learning engine 165. As another example, an automatic approach would to be employ a SHapley Additive explanation (SHAP). The SHAP value for each feature represents the relative impact each feature has on measuring the eventual output of the machine learning engine 165. If a particular feature within the error policy 150 has a SHAP value that exceeds a predetermined value (i.e., representing that the feature has a high impact on the output of machine learning engine 165), this feature can be automatically highlighted to a user.

The error policy 150 can also be used to develop an alternative approach for handling inputs that fall into a slice (i.e. without necessarily trying to analyze the root cause). For example, a developer may add rules to indicate outputs for such records, instead of the output (e.g., recommendation or classification) suggested by the machine learning engine 165 for which the error policy 150 was created. Alternatively, the developer may train an alternative machine learning model (not illustrated), such as one with different hyperparameters, for such observations.

Figure 3:
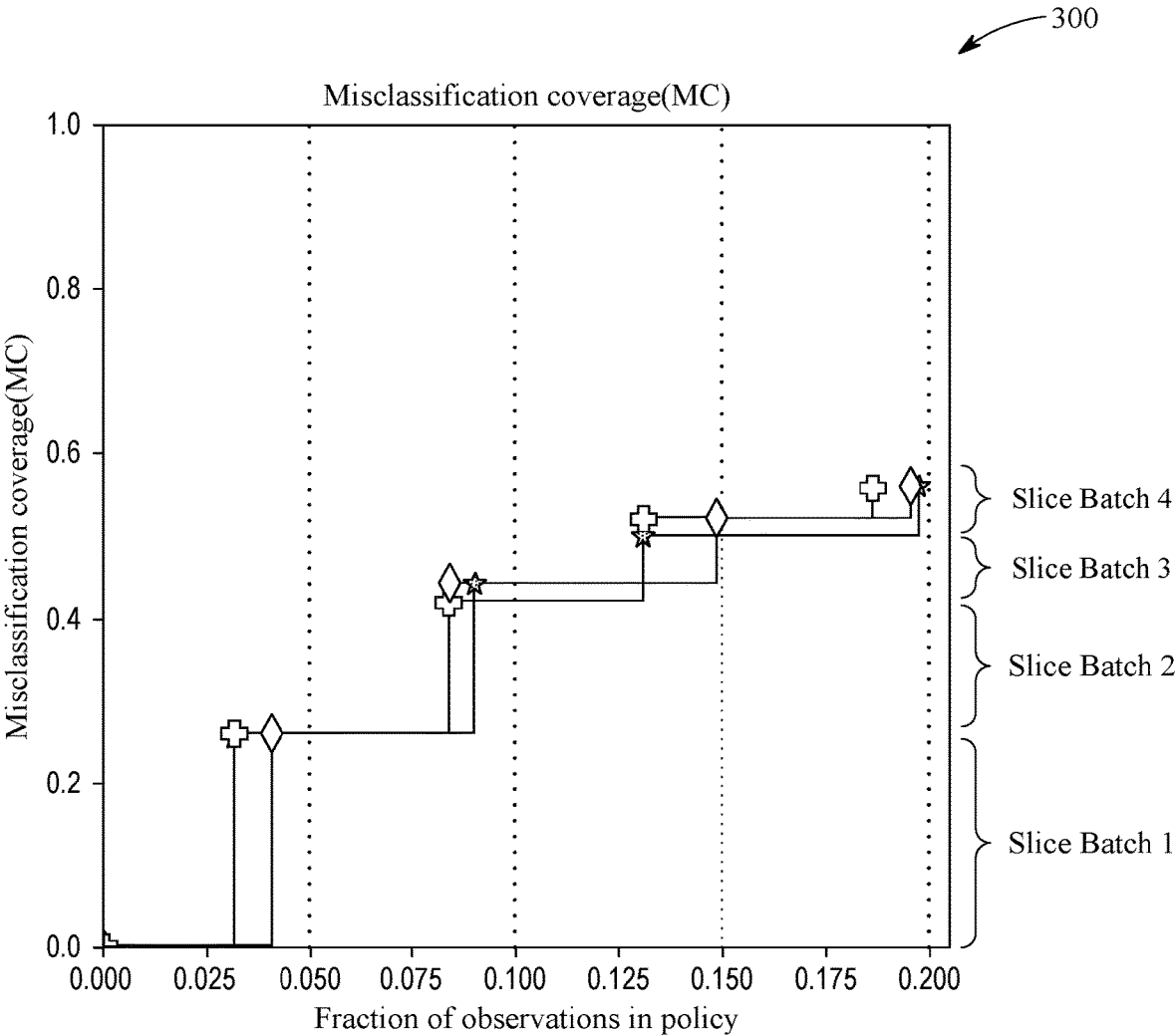
FIG. 3 is a plot illustrating how misclassification coverage for a particular dataset increases based upon the number of slices selected.

FIG. 3 is a plot 300 illustrating how misclassification coverage for a particular dataset 160 increases based upon the number of slices selected and how an error policy 150 is constructed. The x-axis of the plot 300 is a size of the error policy 150 as a proportion of the dataset 160, and the y-axis is a proportion of errors contained in the error policy 150. For a low budget (left on the x-axis), the slices selected for the error policy 150 (e.g., slice batch 1) will have a high coverage of errors since the selected slices should define a subset of observations with the highest concentration of errors. As subsequent slice batches 2-4 are added, these slice batches 2-4 will have lower concentration of errors. Consequently, the error coverage (i.e., the y-axis) of the error policy 150 should increase, but at a decreasing rate. For example, if the policy error policy 150 identifies 45 observations, the error policy 150 may cover ⅔rds of the total errors in the dataset 160. However, if the error policy 150 is expanded to identify another 45 observations, the error policy 150 may only cover an additional ⅛th of the total errors in the dataset 160. As discussed above, the predefined value that determines how many (or what percentage) of observations by the error policy 150 is also referred to as a "budget."

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 4:
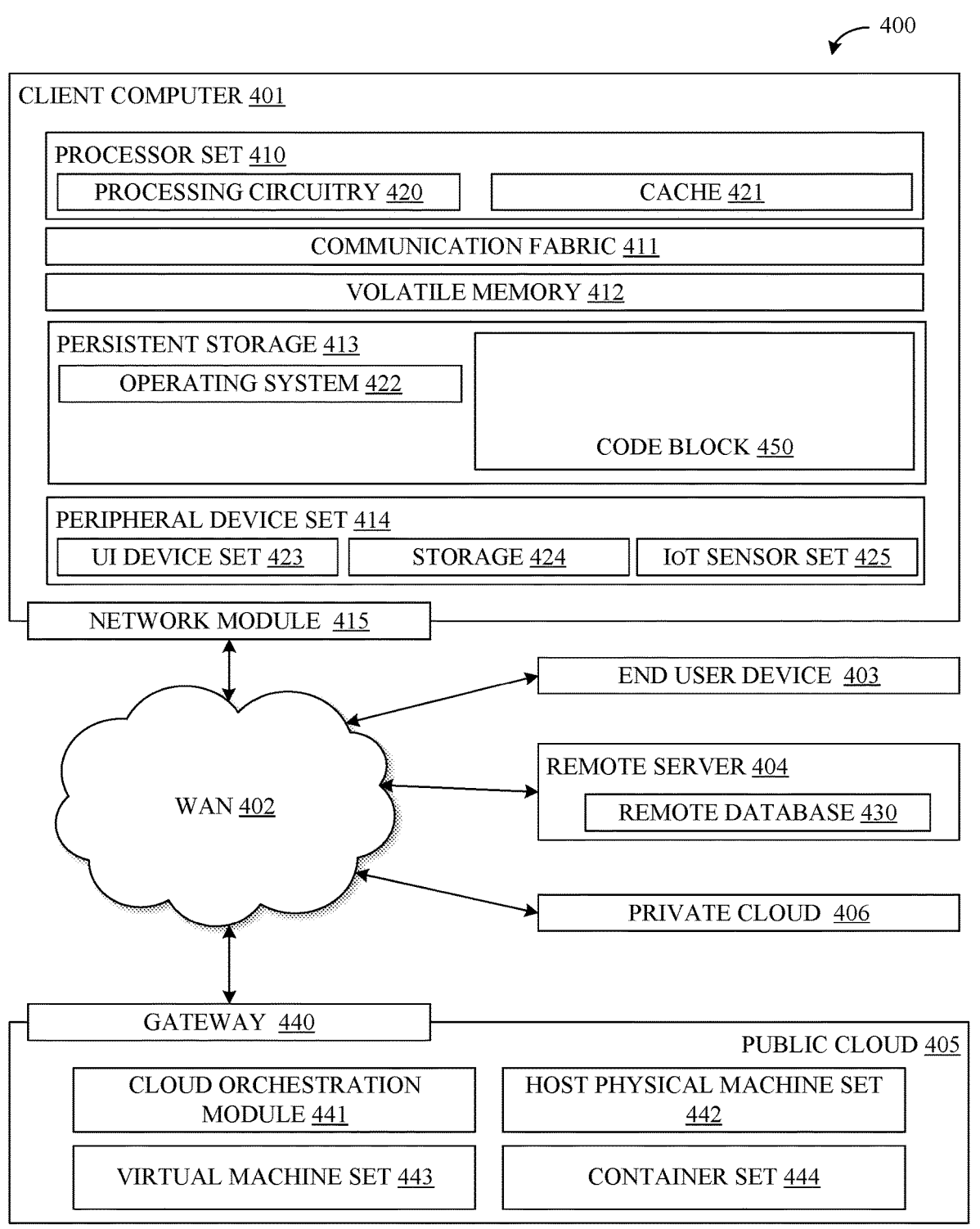
FIG. 4 is a block diagram illustrating an example of computer environment for implementing the methodology of FIG. 2.

Referring to FIG. 4, computing environment 400 contains an example of an environment for the execution of at least some of the computer code involved in performing the inventive methods, such as code block 450 for the policy generation system 100. Computing environment 400 includes, for example, computer 401, wide area network (WAN) 402, end user device (EUD) 403, remote server 404, public cloud 405, and private cloud 406. In certain aspects, computer 401 includes processor set 410 (including processing circuitry 420 and cache 421), communication fabric 411, volatile memory 412, persistent storage 413 (including operating system 422 and method code block 450), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. However, to simplify this presentation of computing environment 400, detailed discussion is focused on a single computer, specifically computer 401. Computer 401 may or may not be located in a cloud, even though it is not shown in a cloud in FIG. 4 except to any extent as may be affirmatively indicated.

Processor set 410 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In certain computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code block 450 in persistent storage 413.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 411 is the signal conduction paths that allow the various components of computer 401 to communicate with each other. Typically, this communication fabric 411 is made of switches and electrically conductive paths, such as the switches and electrically conductive paths that make up busses, bridges, physical input/output ports and the like. Other types of signal communication paths may be used for the communication fabric 411, such as fiber optic communication paths and/or wireless communication paths.

Volatile memory 412 is any type of volatile memory now known or to be developed in the future. Examples include dynamic type random access memory (RAM) or static type RAM. Typically, the volatile memory 412 is characterized by random access, but this is not required unless affirmatively indicated. In computer 401, the volatile memory 412 is located in a single package and is internal to computer 401. In addition to alternatively, the volatile memory 412 may be distributed over multiple packages and/or located externally with respect to computer 401.

Persistent storage 413 is any form of non-volatile storage for computers that is now known or to be developed in the future. The non-volatility of the persistent storage 413 means that the stored data is maintained regardless of whether power is being supplied to computer 401 and/or directly to persistent storage 413. Persistent storage 413 may be a read only memory (ROM), but typically at least a portion of the persistent storage 413 allows writing of data, deletion of data and re-writing of data. Some familiar forms of persistent storage 413 include magnetic disks and solid state storage devices. Operating system 422 may take several forms, such as various known proprietary operating systems or open source Portable Operating System Interface type operating systems that employ a kernel. The code included in code block 450 typically includes at least some of the computer code involved in performing the inventive methods.

Peripheral device set 414 includes the set of peripheral devices for computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some aspects, storage 424 may take the form of a quantum computing storage device for storing data in the form of qubits. In aspects where computer 401 is required to have a large amount of storage (for example, where computer 401 locally stores and manages a large database) then this storage 424 may be provided by peripheral storage devices designed for storing very large amounts of data, such as a storage area network (SAN) that is shared by multiple, geographically distributed computers. Internet-of-Things (IOT) sensor set 425 is made up of sensors that can be used in IoT applications. For example, one sensor may be a thermometer and another sensor may be a motion detector.

Network module 415 is the collection of computer software, hardware, and firmware that allows computer 401 to communicate with other computers through a Wide Area Network (WAN) 402. Network module 415 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 415 are performed on the same physical hardware device. In other aspects (for example, aspects that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any Wide Area Network (for example, the internet) capable of communicating computer data over non-local distances by any technology for communicating computer data, now known or to be developed in the future. In some aspects, the WAN 402 may be replaced and/or supplemented by local area networks (LANs) designed to communicate data between devices located in a local area, such as a Wi-Fi network. The WAN 402 and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In certain aspects, EUD 403 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404. As defined herein, the term "server" means a data processing system configured to share services with one or more other data processing systems.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other aspects, a private cloud 406 may be disconnected from the internet entirely (e.g., WAN 402) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 405 and private cloud 406 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including." "comprises," and/or "comprising." when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement." "one aspect." "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement." "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method within a computer hardware system including a slice generator and a policy generator, comprising:

slicing, using the slice generator, a first dataset including true values and predicted values of a class variable into a plurality of slices each defining a plurality of observations within the first dataset;

generating a union of observations by iteratively adding observations within one or more slices of the plurality of slices to observations within the union of observations until a number of observations within the union of observations reaches a predetermined value;

generating, using the policy generator and after the number of observations within the union of observations reaches the predetermined value, an error policy, wherein the predicted values were generated by a machine learning engine, and wherein the error policy is applied to a second dataset different than the first dataset;

determining performance of the error policy based on an error proportion for the first dataset and an error proportion for the second dataset; and utilizing the error policy to improve the machine learning engine based on the performance of the error policy.

2. The method of claim 1, wherein the error policy includes all feature value conditions used to generate each of the one or more slices.

3. The method of claim 1, wherein the machine learning engine is modified based upon the error policy.

4. The method of claim 1, wherein the one or more slices are selected based upon a ratio of observations having predicted values not equaling true values for each of the one or more slices.

5. The method of claim 1, wherein the predetermined value is an absolute number of observations in the union of observations.

6. The method of claim 1, wherein the predetermined value is a percentage of observations in the first dataset.

7. The method of claim 1, wherein the error policy is applied to the second dataset different than the first dataset to generate a second union of observations for the second dataset.

8. A computer hardware system comprising at least one hardware processor configured to perform the following executable operations:

slicing a first dataset including true values and predicted values of a class variable into a plurality of slices each defining a plurality of observations within the first dataset;

generating a union of observations by iteratively adding observations within one or more slices of the plurality of slices to observations within the union of observations until a number of observations within the union of observations reaches a predetermined value;

generating, after the number of observations within the union of observations reaches the predetermined value, an error policy, wherein the predicted values were generated by a machine learning engine, and wherein the error policy is applied to a second dataset different than the first dataset;

determining performance of the error policy based on an error proportion for the first dataset and an error proportion for the second dataset; and utilizing the error policy to improve the machine learning engine based on the performance of the error policy.

9. The system of claim 8, wherein the error policy includes all feature value conditions used to generate each of the one or more slices.

10. The system of claim 8, wherein the machine learning engine is modified based upon the error policy.

11. The system of claim 8, wherein the one or more slices are selected based upon a ratio of observations having predicted values not equaling true values for each of the one or more slices.

12. The system of claim 8, wherein the predetermined value is an absolute number of observations in the union of observations.

13. The system of claim 8, wherein the predetermined value is a percentage of observations in the first dataset.

14. The system of claim 8, wherein the error policy is applied to the second dataset different than the first dataset to generate a second union of observations for the second dataset.

15. A computer program product, comprising:

a computer readable storage medium having stored therein program code for training a training dataset, the program code, which when executed by a computer hardware system including a slice generator and a policy generator, causes the computer hardware system to perform:

slicing, using the slice generator, a first dataset including true values and predicted values of a class variable into a plurality of slices each defining a plurality of observations within the first dataset;

generating a union of observations by iteratively adding observations within one or more slices of the plurality of slices to observations within the union of observations until a number of observations within the union of observations reaches a predetermined value;

generating, using the policy generator and after the number of observations within the union of observations reaches the predetermined value, an error policy, wherein the predicted values were generated by a machine learning engine, and wherein the error policy is applied to a second dataset different than the first dataset;

determining performance of the error policy based on an error proportion for the first dataset and an error proportion for the second dataset; and utilizing the error policy to improve the machine learning engine based on the performance of the error policy.

16. The computer program product of claim 15, wherein the error policy includes all feature value conditions used to generate each of the one or more slices.

17. The computer program product of claim 15, wherein the machine learning engine is modified based upon the error policy.

18. The computer program product of claim 15, wherein the one or more slices are selected based upon a ratio of observations having predicted values not equaling true values for each of the one or more slices.

19. The computer program product of claim 15, wherein the predetermined value is one of an absolute number of observations in the union of observations or as a percentage of observations in the first dataset.

20. The computer program product of claim 15, wherein the error policy is applied to the second dataset different than the first dataset to generate a second union of observations for the second dataset.

* * * * *